United States Patent
Francisco et al.

(10) Patent No.: US 6,858,198 B2
(45) Date of Patent: Feb. 22, 2005

(54) METHOD FOR REGULATING WATER CONCENTRATION IN A PROCESS STREAM

(75) Inventors: Troy W. Francisco, Williamson, NY (US); Charles L. Redmon, Orchard Park, NY (US); Kenneth E. Creasy, Budd Lake, NJ (US); John L. Welch, Williamsville, NY (US); William A. Pepe, Baton Rouge, LA (US)

(73) Assignee: Honeywell International, Morristown, NJ (US)

( * ) Notice: Subject to any disclaimer, the term of this patent is extended or adjusted under 35 U.S.C. 154(b) by 63 days.

(21) Appl. No.: 10/051,512

(22) Filed: Jan. 18, 2002

(65) Prior Publication Data

US 2002/0155057 A1 Oct. 24, 2002

Related U.S. Application Data

(60) Provisional application No. 60/262,818, filed on Jan. 19, 2001.

(51) Int. Cl.[7] .................................................. C01B 7/19
(52) U.S. Cl. ........................ 423/485; 423/483; 73/61.48
(58) Field of Search ................................ 423/485, 483, 423/522; 73/61.48, 61.46, 61.49

(56) References Cited

U.S. PATENT DOCUMENTS

| | | | |
|---|---|---|---|
| 3,167,391 A | | 1/1965 | Swinehart |
| 4,292,289 A | | 9/1981 | Cannon et al. ............. 423/301 |
| 5,271,918 A | * | 12/1993 | Patterson et al. ........... 423/485 |
| 5,851,837 A | * | 12/1998 | Stokes et al. ............... 436/149 |
| 6,350,426 B1 | * | 2/2002 | Sota et al. ................... 423/485 |

FOREIGN PATENT DOCUMENTS

| | | |
|---|---|---|
| EP | 0 990898 A1 | 3/1997 |
| JP | 05-026853 * | 2/1993 |
| WO | WO 97/35187 | 9/1997 |

OTHER PUBLICATIONS

"Chemical Abstracts", vol. 82 (1975) p. 726 (67764p) ASI Applied Systems Copyright 1998, "Sampling Technology for FTIR Chemical Monitoring and Process Analysis," (4 pages), no month.

L. Marangoni & R. Madiolo of Montedison SpA, Porto Marghera, Italy from La Chimica e l'Industria 62/3 (pp. 189–192) 1980 (Translation from Italian), "Procedure For the Determination Of The Composition of HF/H2S04/FSO3H/H20 Solutions", no month.

(List continued on next page.)

Primary Examiner—Ngoc-Yen Nguyen
(74) Attorney, Agent, or Firm—Deborah Chess (57) ABSTRACT

Provided is a method for regulating the concentration of water in the acid feed stream in a process for the production of HF by the reaction with a fluorine containing material, the method comprising:

(a) providing an acid feed stream comprising bound water and free water;
(b) estimating the concentration of bound water and free water in the acid feed stream by providing a probe in said feed stream; and
(c) adjusting the concentration of free water in said process stream based on said estimating step.

7 Claims, 5 Drawing Sheets

OTHER PUBLICATIONS

E. Katherine Hemsley, R.H. Wilson and P.S. Belton, "Potential of Fourier Transform Infrared Spectroscopy and Fiber Optics for Process Control," *J. Agric. Food Chem.*, vol. 40 (1992), pp. 435–438, no month.

R.A. Heikka, K.T, Immonen, P.O. Minkkinen, E.Y.O. Paatero, T.O. Salmi, "Determination of acid value, hydroxyl value and water content in reactions between dicarboxylic acids and diols using near–infrared spectroscopy and non–linear partial least squares regression," *Analytica Chimica Acta* 349 (1997 Elsevier Science B.V.), pp. 287–294, no month.

B.B. Randolph, A.D. Eastman, R.L. Heald, "Near Infrared-Spectroscopy for On–Line Analysis of Alkylation Process Acids," pp. 291–293, no month.

R.K. Bade, K.L. Gallaher, S.B. Hunt, G.L. Combs, E.L. Kesselhuth, Abstract: "The On–Line Determination of Total Olefins in Gasoline by Process Gas Chromatography and Fourier Transfor Infrared Spectroscopy," ISA 1996, Paper #96–004, pp. 33–42, no month.

\* cited by examiner

METHOD FOR REGULATING WATER CONCENTRATION IN A PROCESS STREAM

CROSS REFERENCE TO RELATED APPLICATION

The present application claims priority to U.S. Provisional Application No. 60/262,818, filed with the United States Patent and Trademark Office on Jan. 19, 2001, which is incorporated herein by reference.

FIELD OF INVENTION

The present invention relates to methods for controlling the water content of corrosive and/or erosive process streams, such as low pH process streams, and more particularly to methods for producing hydrogen fluoride ("HF") which involve the use of an acidic feed stream.

BACKGROUND OF THE INVENTION

The commercial manufacture of hydrofluoric acid ("HF") typically consists of heating a mixture of a flouride bearing material, such as fluorspar and an acid feed stream, which is usually rich in acid, such a sulfuric acid, to produce a gaseous reaction product rich in HF. Such processes are disclosed in each of the following U.S. Patents, each of which is incorporated herein by reference: U.S. Pat. Nos. 4,292,289 and 3,167,391. The acid feed stream in many cases comprises a mixture of acids, with the acid mixture frequently comprising a major proportion of sulfuric acid and minor proportions hydrofluoric acid and fluorosulfonic acid. The acid feed stream also typically contains water. The efficiency and effectiveness of such HF manufacturing processes is a function of the relative amount of water in the acid feed stream.

At least a portion of the water contained in an acid mixture is produced via an equilibrium reaction, such as that involved in the three acid mixture shown in Formula 1 below.

$$H_2SO_4 + HF \leftrightarrows HSO_3F + H_2O \qquad (1)$$

The water produced by such a reaction is said to be "bound" to the reaction and generally must remain in the acid mixture to ensure a higher-quality product. As "bound water" is removed from the above noted acid mixture, the reaction will be driven toward the production of fluorosulfonic acid, and as a result the HF produced in the manufacturing process will tend to contain undesirably higher amounts of fluorosulfonic acid and other unwanted contaminants. Thus, the removal of "bound" water from the acid feed stream generally results in a lower quality HF product.

Additionally, the aforementioned acid mixture generally contains some amount of "free water," that is, any water present in an amount greater than the equilibrium concentration. Free water is introduced into the acid feed stream in a variety of ways, including: contaminated acid materials, atmospheric leaks, recycled process streams, in-line breaks for maintenance, and the like. Such free water is generally undesirable. For example, the presence of free water in the acid feed results in a process reaction which is more erosive and corrosive to the reaction vessel, furnace and other equipment used in the manufacture of HF in comparison to reactions in which the acid feed contains no free water.

Unfortunately, due at least in part to the highly corrosive nature of the aforementioned acid mixtures, traditional methods for regulating the water content in the acid feed stream tend to be relatively inaccurate and time-consuming.

For example, one traditional method for controlling the amount of water in an acid mixture comprises the step of calculating water concentration as disclosed in "Procedure for the Determination of the Composition of $HF/H_2SO_4/FSO_3H/H_2O$ Solutions" *La Chimica e l'Industria*, 62/3 (1980) pp. 189–192, L. Marangoni and R. Madiolo, incorporated herein by reference. This calculation method requires removing a sample from the acid feed in an HF production process and subjecting the sample to two titration processes and a distillation process. Based on these processes steps, an estimate of the amount of free water is made based on calculated concentrations of the water and acid components in the mixture. A system operator then considers these estimates in his/or her efforts to optimize the process.

However, as indicated in the Marangoni and Madiolo article, the concentrations used to control water content via the aforementioned method are inexact values which reflect the imprecisions of each of the three analytical methods. Accordingly, the prior art method tends to be inaccurate and imprecise in the control of water concentration. Additionally, the aforementioned method requires significant time to remove and analyze a sample as described. Thus, any control action that is taken may be ineffective, or in fact detrimental, because of the undesirably large time interval between sampling and actual implementation of process modification.

Recognizing these and other drawbacks of the prior art, the present inventors have perceived a need for a new, efficient and more accurate method for controlling the water concentration of an acid feed stream. These and other objects are achieved by the present invention as described below.

DETAILED DESCRIPTION

The present inventors have discovered a process which is particularly advantageous for regulating the concentration of water in a process stream that is highly corrosive and/or erosive and in which the concentration of water in the stream effects the effectiveness or efficiency of the process in which it is used. In preferred embodiments, the process comprises the steps of: (a) providing a corrosive and/or erosive process stream; (b) estimating the concentration of water in the process stream by providing a probe in said process stream; and (c) adjusting the concentration of water in said process stream based on said estimating step. According to preferred embodiments, the probe includes means for interacting with said process stream and generating an information signal which is based on said interaction and which is functionally related to the concentration of water in the process stream. It is also preferred that the estimating step comprises electronically computing an estimated concentration of water in said process stream on the basis of the interaction between said probe and said process stream, preferably by inputting said information signal, or a signal based thereon, to a computing means, such as a computer.

An important aspect of one embodiment of the present invention is the use of probe which has a very short time interval, sometimes referred to herein as "dwell time," between the interaction with the process stream and the generation of the information signal. Coupling of a such a probe with an electronic computing means has numerous advantages over prior methods. For example, prior art methods which require sample extraction and containment, and off-line analysis of the sample, have long dwell times (eg. on the order of several hours) and thus produce relatively poor regulation of the process. The preferred aspects of the present invention provide a very accurate means for rapidly measuring and controlling the water concentration of such a feed stream. This, in turn, allows for the production of a higher-quality product and tends to reduce the maintenance required for system equipment.

Providing an Acid Feed Stream

The first step according to preferred embodiments of the present invention is to provide a feed stream comprising, and preferably consisting essentially of, a mixture of one or more acids and water. While applicants envision the use of a wide range of corrosive and/or erosive feed streams, including caustic streams, in preferred embodiments the feed stream is a highly acidic stream which comprises sulfuric acid, HF, fluorosulfonic acid and water, as is frequently used in the manufacture of HF. As illustrated above in Formula 1, the acids and water in such acid mixtures tend to be in equilibrium.

According to the present invention, the preferred acid mixture may be provided by any available source. In certain preferred embodiments, the providing step (a) comprises making the feed stream accessible, either directly or indirectly, to the probe of the present invention, preferably as part of an integrated acid production facility, for example, an HF production facility. As is known, many present HF facilities produce reaction product streams comprising multi-component acid mixtures, including sulfuric acid, HF, fluorosulfonic acid and water, which are frequently introduced into a sulfuric acid feed stream.

The corrosive feed stream in accordance with the present invention can be a gas phase stream, a liquid phase stream, or a combination of liquid and gas phases. In preferred embodiments, the feed stream is a liquid phase stream.

Determining the Water Concentration of the Acid Mixture

The step of determining or estimating the concentration of water in the feed stream preferably comprises determining the concentration of water in the stream using an in-line measurement system. In general, the in-line measurement system of the present invention may comprise any in-line device or devices capable of taking measurements in the corrosive environment of the feed stream. As used herein, the term "in-line" device refers to a device in which at least a portion of the device is in contact with the feed stream or a representative sampling of the feed stream, provided the sampling is substantially proximate to and/or in fluid communication with the feed stream.

In preferred embodiments, the in-line device comprises a probe, and the probe is substantially continuously exposed to the feed stream or a sample thereof, and even more preferably without direct human intervention. Any of a wide range of probes can be used in the in-line measurement systems according to the present invention. For example, the 1998 Applied Systems "Sampling Technology" brochure, incorporated herein by reference, describes ATR probes, such as the Process IR and DiComp ATR sensor which are suitable for use in the present invention. Preferably, the probes for use in the present invention comprise a means for interacting with an acid feed stream, a means for generating an information signal based on the interaction of the probe with the feed stream, or a combination thereof. The means for interacting with a feed stream may comprise a sensor surface, chamber, and the like. The means for generating an information signal may comprise a processor and the like.

The in-line measurement systems for use in the present invention may also comprise other measurement devices, including "in-line" devices other than probes. Examples of other measurement devices suitable for use in the present invention include in-line infrared ("IR") or near-IR analyzers, and the like, especially those capable of being equipped with ATR probes, as well as, safety isolation valves and environmental controls. A wide range of measurement devices suitable for use in the present invention are available commercially. For example, the 1998 Applied Systems "Sampling Technology" brochure, describes infrared analyzers, as well as safety isolation valves and environmental controls, such as "X-Purge," which are available from Applied Systems.

In certain preferred embodiments of the present invention, the in-line measuring system comprises an IR analyzer equipped with an ATR sensor probe. More preferably, the measuring device of the present invention comprises an IR analyzer equipped with an ATR probe or sensor having a diamond surface. Even more preferably, the measuring system of the present invention comprises an IR analyzer equipped with an ATR probe having a diamond surface, a safety isolation valve and environmental control.

In certain preferred embodiments, the measuring system of the present invention further comprises a processor. Any of a wide range of processors can be used in the present invention. Those of ordinary skill in the art will recognize that the processor will most likely comprise a computer, however other processors such as a microprocessor, state machine or other analog or digital processing circuitry may be used. Preferred processors for use in the present invention include those capable of receiving an information signal from an in-line measurement device, such as an IR probe/analyzer, and calculating the total concentration of water, preferably including the concentration of free water in the feed stream. Examples of preferred processors for use in the present invention include personal computers ("PC's"), programmable logic controllers ("PLC'S"), and distributed control systems ("DCS's).

Figure 1:
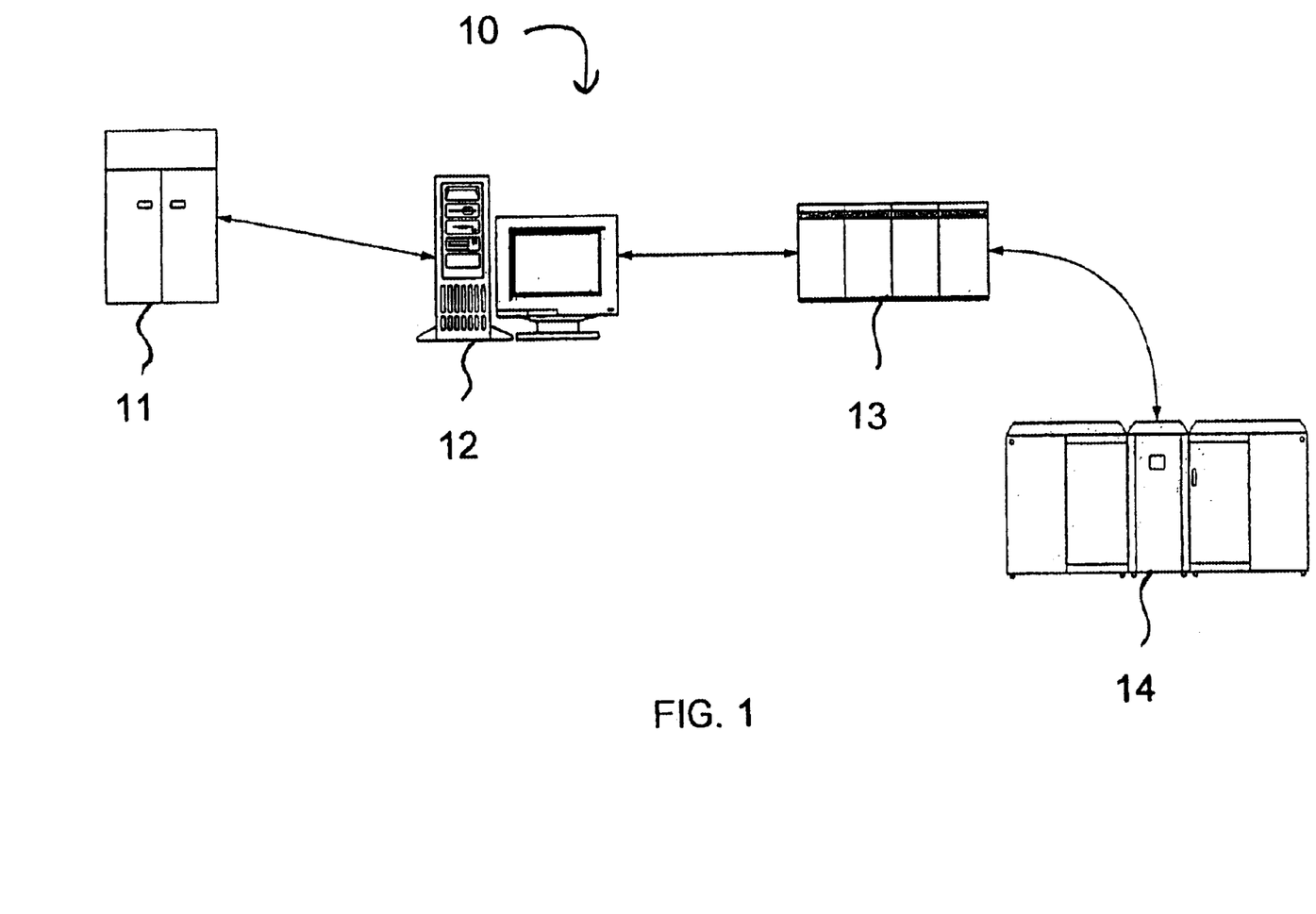

In certain preferred embodiments, the measurement system of the present invention comprises two or more processors for use in determining the concentration of water in an acid mixture. For example, FIG. 1 shows a measurement system 10, according to one embodiment of the present invention, comprising an IR analyzer 11, a PC 12, a PLC 13 and a DCS 14. The analyzer 11 in FIG. 1 produces raw IR data via in-line measurement of an acid mixture (not shown). The raw IR data is transmitted to PC 12 wherein the data is converted to total water concentration data of the acid mixture. The total water concentration data is transmitted as digital data to PLC 13 wherein it is converted to analog data. The analog data is then transmitted to DCS 14 wherein the concentrations of free and bound water are calculated. The free and bound water concentrations are then used as a basis for regulating the concentration of water in the acid mixture according to the present invention.

The measurement system of the present invention can be configured for use in open-loop control or closed-loop control, preferably computer control, of the water content in a feed stream. For example, in the system shown in FIG. 1, the information signal generated by the IR probe is communicated to the DCS. In an open-loop control, the DCS may display the data or information calculated from the data, for example on a computer monitor, so that operators can read the information and make changes to the system to remove water from the system. In a closed-loop control the DCS receives data from the IR and makes the necessary changes to the system to control the water content automatically, without intervention by a human operator. In certain preferred embodiments, the measurement system is configured for use in a closed-loop system.

The measurement system of the present invention may be specifically calibrated and process hardened for use in a variety of corrosive environments. For example, in embodiments of the present invention wherein the acid mixture comprises the four-component mixture described above, the measurement system can be calibrated to calculate the concentration of the four species in the acid mixture. Additionally, the devices of the measurement system may be constructed of or encased in materials which are relatively inert to the corrosive nature of the acid mixture. For example, the IR probe/analyzer may be protected in a stainless steel box to avoid corrosive damage to the analyzer. The devices of the system may also employ redundant power sources. In view of the present disclosure, those of skill in the art will readily be able to configure a calibrated and process-hardened measurement system for use in the present invention without undue experimentation.

The use of a measurement system according to the present invention allows for "real-time" control of water in a feed stream. Because measurement systems of the present invention are adaptable for use in line and can be configured with extremely short dwell times (eg, less than one minute or even less than one second), analytical data can be calculated and updated on a very rapid basis.

Regulating the Water Concentration in the Feed Stream

The regulating step of the present invention comprises generally adjusting the concentration of water in the feed stream based on the concentration of water as determined in the estimating step. Once the concentration of water, and specifically, the concentration of free water in the acid mixture is determined by the estimating step (b), the estimated concentration is used to adjust one or more operating parameters so as effect the concentration of water in the feed stream. For example, if the estimating step indicates that the feed stream contains greater than a desirable concentration of water, the adjusting step may comprise reducing the amount of water in the feed stream, by for example subjecting the feed stream to a drying step. Conversely, if the estimating step indicates that the feed stream contains less than a desirable concentration of water, the adjusting step may comprise increasing the amount of water in the feed stream, by for example introducing additional water into the feed stream.

Any method for reducing the concentration of water in the acid mixture may be used in the present invention. Examples of reducing methods suitable for use in the present invention include introducing, or not, a drying agent to the acid mixture or passing the acid mixture through a molecular sieve dryer. Preferably, the method for removing water according to the present invention comprises adding a drying agent to the acid mixture.

As used herein, the term "drying agent" refers to any material which, when added to an acid mixture containing free water, reduces the concentration of free water in the acid mixture. Examples of drying agents suitable for use in the present invention include oleum, thionyl chloride, and the like. Preferably, the drying agent used in the present invention is oleum. Oleum is an especially preferred drying agent for use in controlling the water in the four-component acid mixture because oleum, which comprises sulfuric acid and $SO_3$, acts to reduce the concentration of water by converting it to sulfuric acid, as shown in Formula 2.

$$H_2O + SO_3 \rightarrow H_2SO_4 \quad (2)$$

This is especially useful in water controlling applications for the production of HF wherein sulfuric acid is a desired reagent in the acid mixture.

The drying agent of the present invention may be added to the acid mixture as a liquid phase stream, a gas phase stream, or a mixture of liquid and gas phase streams. In preferred embodiments, the drying agent is a liquid phase stream.

Any suitable amount of drying agent may be used in the present invention. Preferably, the amount of drying agent used is an amount sufficient to form a "dried" acid mixture comprising a concentration of free water which is lower than the concentration of free water determined in step (b). More preferably, the amount of drying agent used is an amount sufficient to form a dried acid mixture wherein the total water concentration is about equal to the concentration of bound water in the acid mixture.

In especially preferred embodiments, the reducing step of the present invention comprises adding to the acid mixture an amount of oleum sufficient to convert substantially all of the free water to sulfuric acid. As used herein the term "substantially all" means at least about 80% by weight of the free water in the acid mixture.

Production of HF

As indicated above, the present invention can be used to great advantage in the methods of producing HF. Generally, methods of producing HF comprise the steps of: (a) providing an acid feed stream; (b) determining the concentration of free water in said acid feed stream using an in-line measurement system; (c) adjusting the concentration of water in said acid feed stream based on the concentration of water as determined in step (b); and (d) reacting said adjusted acid feed stream with fluorspar to form hydrofluoric acid.

The providing step (a), determining step (b) and adjusting step (c) of the present process are performed as described above. Reacting step (d) generally comprises the steps of mixing the dried acid mixture formed in step (c) with fluorspar to form a reaction mixture and heating said reaction mixture to form HF, as is well known in the art.

EXAMPLES

In order to illustrate, in a non-limiting manner, the present invention is described in connection with the following examples.

Example 1

This example illustrates the efficacy of the present invention in estimating the amounts of sulfuric acid, fluorosulfonic acid, hydrofluoric acid and water present in a corrsive four-component acid mixture.

Seventeen calibration standards (A–Q) comprising varying weights of sulfuric acid, fluorosulfonic acid, hydrofluoric acid and water were prepared. The actual weight percents of each of the four components (based on the total weight of the standard solution) were calculated for each standard based on the known weights of materials added. These calculations were confirmed via ion chromatography.

The infrared spectrum (650–4000 cm$^{-1}$) for each standard was measured using a Process IR MP infrared anaylzer equipped with a DiComp ATR probe from Applied Systems. The infrared data was transmitted to computer wherein the weight percents of each of the four-components were estimated using a partial least squares algorithm.

Figure 2:
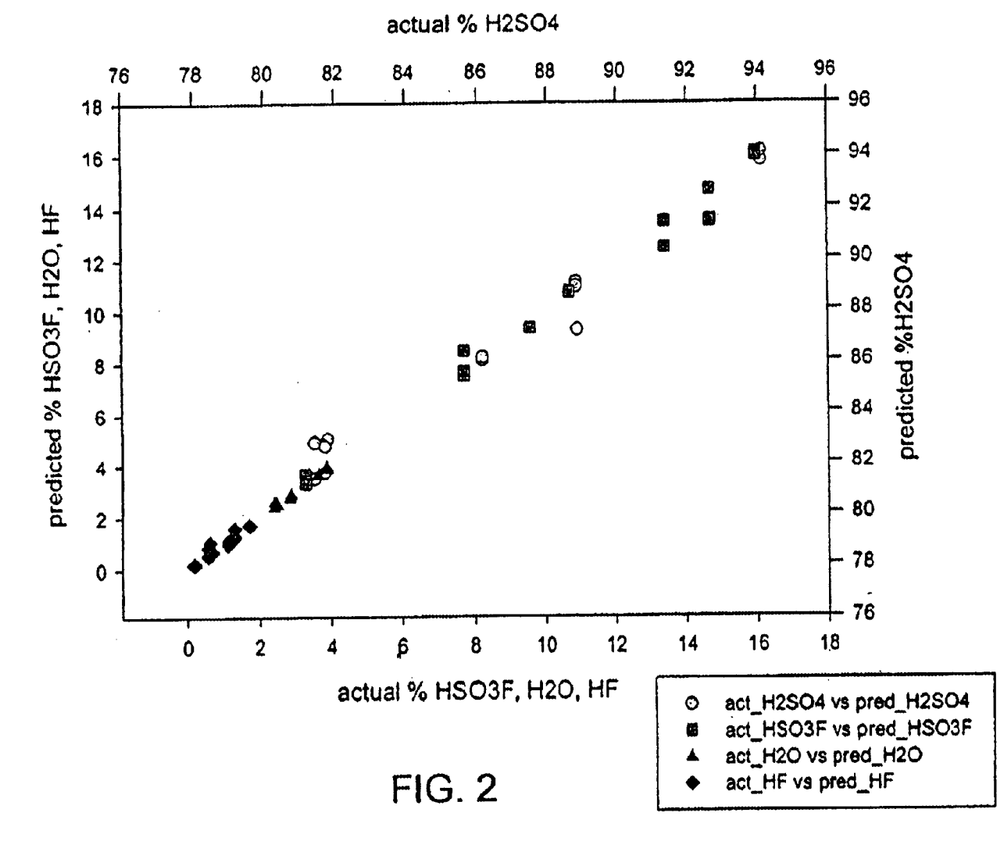

The actual weight percents and estimated weight percents for standards (A–Q) are listed in Table 1. FIG. 2 is a graphical representation of the actual weight percents plotted against the estimated weight percents.

TABLE 1

Weight % of acid solution components based on total weight of acid solution

| Standard | $H_2SO_4$ actual | $H_2SO_4$ predicted | $HSO_3F$ actual | $HSO_3F$ predicted | $H_2O$ actual | $H_2O$ pred. | HF actual | HF pred. |
|---|---|---|---|---|---|---|---|---|
| A | 88.869 | 87.185 | 3.279 | 3.66 | 3.874 | 3.964 | 0.553 | 0.847 |
| B | 81.749 | 82.932 | 7.725 | 8.46 | 2.848 | 2.748 | 1.299 | 1.588 |
| C | 78.371 | 78.358 | 15.993 | 15.935 | 2.486 | 2.537 | 1.716 | 1.723 |
| D | 81.61 | 82.727 | 9.576 | 9.341 | 2.84 | 2.721 | 0.605 | 1.043 |
| E | 86.114 | 86.013 | 14.709 | 13.537 | 2.411 | 2.595 | 1.12 | 0.961 |
| F | 81.377 | 82.823 | 10.722 | 10.766 | 2.84 | 2.751 | 0.677 | 0.694 |
| G | 94.122 | 93.769 | 14.667 | 13.497 | 2.411 | 2.601 | 1.117 | 0.954 |
| H | 81.377 | 82.784 | 3.283 | 3.396 | 2.882 | 2.904 | 0.184 | 0.213 |
| I | 94.122 | 93.739 | 14.667 | 13.473 | 3.635 | 3.669 | 1.117 | 0.985 |
| J | 88.842 | 89.054 | 3.283 | 3.412 | 3.875 | 3.877 | 0.184 | 0.22 |
| K | 81.678 | 82.631 | 7.722 | 7.493 | 3.875 | 3.865 | 0.553 | 0.541 |
| L | 78.407 | 78.397 | 13.389 | 12.46 | 2.411 | 2.408 | 1.298 | 1.239 |
| M | 78.407 | 78.351 | 16 | 16.046 | 2.882 | 2.889 | 1.717 | 1.687 |
| N | 94.122 | 94.1 | 16 | 16.092 | 3.635 | 3.624 | 1.717 | 1.689 |
| O | 88.842 | 88.888 | 3.283 | 3.299 | 3.875 | 3.882 | 0.184 | 0.189 |
| P | 81.678 | 81.61 | 7.722 | 7.674 | 2.486 | 2.488 | 0.553 | 0.543 |
| Q | 78.407 | 78.453 | 13.389 | 13.459 | 2.84 | 2.838 | 1.298 | 1.313 |

Example 2

This example illustrates the process capability of the present invention.

The capability index (Cp) of a process is a relative measurement of the ability of the process to remain within its specification limits for free water in light of shifts in the quantity of free water in the system due to process upsets. A higher capability index indicates a greater capability for handling shifts in the quantity of process free water. The Cpk of a process is a measurement of how well the distribution of free water in the process is centered within the process limits. A higher Cpk indicates a desirably more centered distribution.

The Cp and Cpk of a process of the present invention was measured as described below. The four-component acid feed of a system configured for the production of HF and regulated according to the present invention was monitored over a period of twelve days using a Process IR MP infrared anaylzer equipped with a DiComp ATR probe from Applied Systems. The weight percent of each of the three acids, the total water and the free water (based on total weight of the four-component mixture) was estimated on an hourly basis. The process data, observed performance, experimental "within" performance, and experimental "overall" performance data is listed in Table 2.

Figure 3:
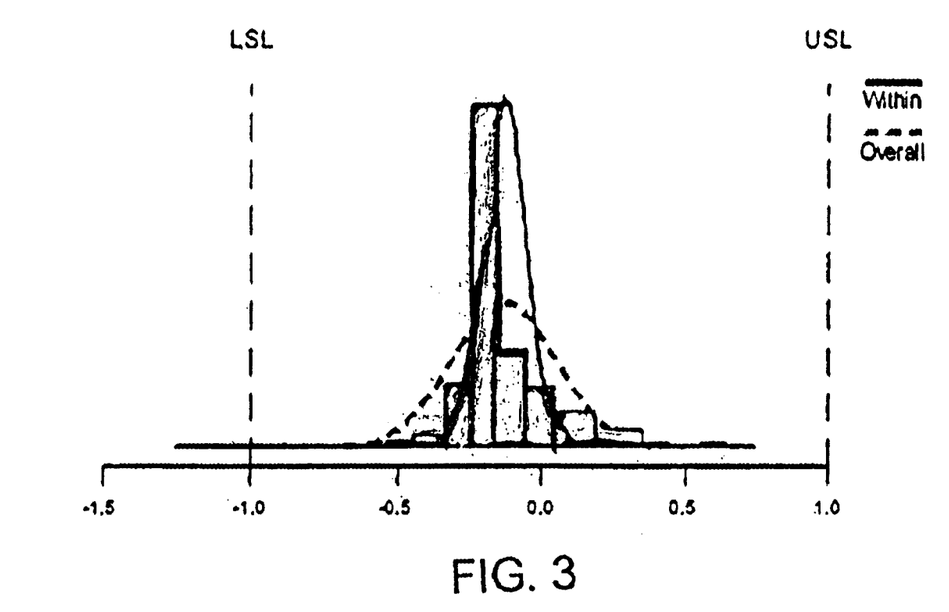

FIG. 3 is a histogram of the free water concentration data collected over the twelve days. Indicated on the graph are lower specification limit ("LSL") for free water content in the HF production system (−1.0 weight % of free water) and the upper specification limit ("USL") (1.0 weight %). As shown in FIG. 3, the distribution of free water weight percent is within the specification limits and is relatively centered therein with a slight negative bias. The process capability indexes Cp and Cpk were calculated via known methods and were 4.25 and 3.68 respectively.

TABLE 2

| Process Data | | Observed Performance | Exp. "Within" Performance | Exp. "Overall" Performance |
|---|---|---|---|---|
| USL | 1.00000 | PPM < LSL 3460.21 | PPM < LSL 0.00 | PPM < LSL 1.15 |

TABLE 2-continued

| Process Data | | Observed Performance | Exp. "Within" Performance | Exp. "Overall" Performance |
|---|---|---|---|---|
| LSL | −1.00000 | PPM > USL 0.00 | PPM > USL 0.00 | PPM > USL 0.00 |
| Mean | −0.13506 | PPM Total 3460.21 | PPM Total 0.00 | PPM Total 1.15 |
| Sample N | 289 | — | — | — |
| StDev (within) | 0.078376 | — | — | — |
| StDev (within) | 0.183052 | — | — | — |

Comparative Example 1

This example illustrates the process capability of a process regulated using a traditional inferential model to estimate free water content.

The weight percent of the free water (based on total weight of the four-component mixture) in the acid feed of an HF-producing system regulated using an inferential model created by Aspen Tech of Dallas, Tex. was estimated on an hourly basis for 14 days. The process data, observed performance, experimental "within" performance, and experimental "overall" performance data is listed in Table 3.

Figure 4:
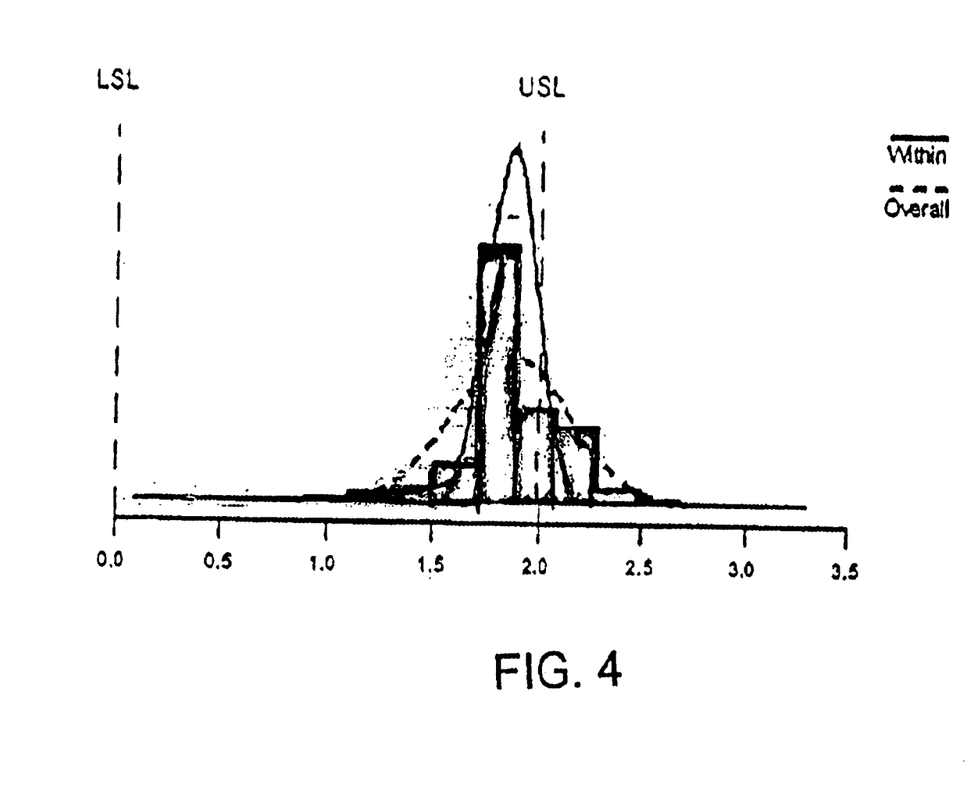

FIG. 4 is a histogram of the free water concentration data collected over the 14 days. Indicated on the graph are lower specification limit ("LSL") for free water content in the HF production system (0.0 weight % of free water) and the upper specification limit ("USL") (2.0 weight %). As shown in FIG. 4, a significant portion of the distribution of free water weight percent falls outside the upper specification limit and the distribution is not centered within the limits. The process capability indexes Cp and Cpk were calculated via known methods and were 2.77 and 0.37 respectively.

TABLE 3

| Process Data | | Observed Performance | | Exp. "Within" Performance | | Exp. "Overall" Performance | |
| --- | --- | --- | --- | --- | --- | --- | --- |
| USL | 2.00000 | PPM < LSL | 0.00 | PPM < LSL | 0.00 | PPM < LSL | 1.15 |
| LSL | 0.00000 | PPM > USL | 287833.83 | PPM > USL | 135734.34 | PPM > USL | 321952.08 |
| Mean | 1.86783 | PPM Total | 3460.21 | PPM Total | 0.00 | PPM Total | 1.15 |
| Sample N | 337 | — | — | — | — | — | — |
| StDev (within) | 0.120185 | — | — | — | — | — | — |
| StDev (within) | 0.285921 | — | — | — | — | — | — |

Example 3

This example illustrates the efficacy of the instant process for regulating the water content in an HF production process.

Figure 5:
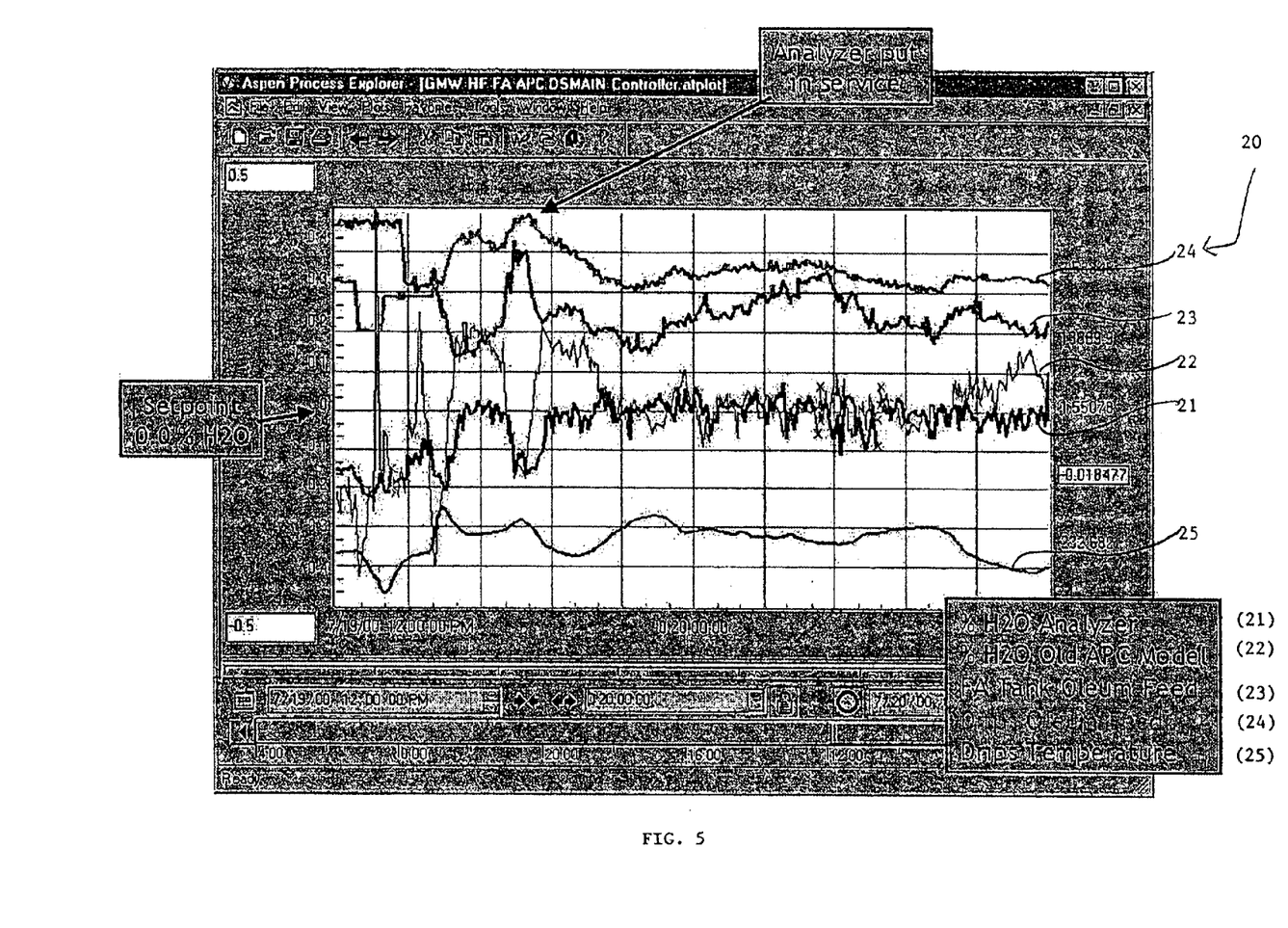

FIG. 5 is a graphical representation 20 of process data collected via several different methods from an HF production process. Line 21 is an estimate, calculated via an in-line analyzer of the present invention, of the % weight of free water in the four-component acid stream of the process over 16 hours. Line 22 is an estimate, calculated via an inferential model created by Aspen Tech of Dallas, Tex., of the % weight of free water in the four-component acid stream of the process over 16 hours. Lines 23 and 24 represent a measure of the flow rates of the oleum feeds into the free acid stream of the process. Line 25 represent a measure of a key temperature used by the inferential model to estimate water content.

Indicated on FIG. 5, via the legend "analyzer put in service", is a point in time at which an in-line analyzer of the present invention was first implemented to regulate the water content of the HF production process. Prior to that point, the water content was regulated based on estimates made by the inferential model. Prior to implementation of the analyzer of the present invention, there is significant variation in the water measurements estimated by both the in-line analyzer and the inferential model. Once the in-line analyzer is used to regulate the water in the system, the in-line measurements settle to about the setpoint of 0.0% free water and the inferential model settles to around 1.6%.

What is claimed is:

1. A method for regulating the concentration of water in the acid feed stream in a process for the production of HF by the reaction with a fluorine containing material comprising:
   (a) providing an acid feed stream comprising acid, bound water and free water;
   (b) estimating the concentration of bound water and free water in the acid feed stream providing a diamond-tipped ATR probe in at least a portion of said feed stream; and
   (c) adjusting the concentration of free water in said acid feed stream based on said estimating step.

2. A method for controlling water content of an acid comprising the steps of:
   (a) providing an acid;
   (b) determining the concentration of water in said acid using an in-line measurement system comprising a computer and an infrared analyzer equipped with a diamond-tipped ATR probe; and
   (c) adjusting the concentration of free water in said acid based on the concentration of water measured in step (b).

3. The method of claim 2 wherein said acid comprises sulfuric acid, hydrofluoric acid, fluorosulfonic acid, and water.

4. The method of claim 2 wherein said adjusting step (c) comprises adding a drying agent to said acid mixture to form a dried acid mixture comprising a concentration of free water lower than the concentration determined in step (b).

5. A method for manufacturing hydrofluoric acid comprising the steps of:
   (a) providing an acid mixture;
   (b) determining the concentration of free water in said acid mixture using an in-line measurement system comprising a computer and an infrared analyzer equipped with a diamond-tipped probe;
   (c) adding a drying agent to said acid mixture to form a dried acid mixture comprising a concentration of free water lower than the concentration determined in step (b);
   (d) reacting said dried acid mixture with fluorspar to form hydrofluoric acid.

6. A method for manufacturing hydrofluoric acid comprising the steps of:
   (a) providing a stream comprising sulfuric acid, hydrofluoric acid, fluorosulfonic acid and water;
   (b) determining the concentrations of free water and bound water in said stream using an in-line measurement system comprising a computer and an infrared analyzer equipped with a diamond-tipped ATR probe;
   (c) adjusting the concentration of free water in said acid feed stream based on said determining step; and
   (d) reacting said adjusted acid feed stream with fluorspar to form hydrofluoric acid.

7. The method of claim 6 wherein said adjusting step comprises introducing an amount of sulfur trioxide sufficient to convert substantially all of said free water in said stream to sulfuric acid.

* * * * *